United States Patent
Kuntzevitsky

(10) Patent No.: US 12,304,815 B2
(45) Date of Patent: May 20, 2025

(54) PLANT FOR THE PRODUCTION OF HYDROGEN FROM ANY HYDROCARBON GASES

(71) Applicant: DIDATECH CORPORATION, Wilmington, DE (US)

(72) Inventor: Igor Kuntzevitsky, Bolton (CA)

(73) Assignee: Didatech Corporation, Wilmington, DE (US)

( * ) Notice: Subject to any disclaimer, the term of this patent is extended or adjusted under 35 U.S.C. 154(b) by 822 days.

(21) Appl. No.: 17/412,956

(22) Filed: Aug. 26, 2021

(65) Prior Publication Data
US 2022/0194788 A1    Jun. 23, 2022

Related U.S. Application Data

(60) Provisional application No. 63/129,027, filed on Dec. 22, 2020.

(51) Int. Cl.
*C01B 3/26*    (2006.01)
*B01J 19/24*   (2006.01)
(Continued)

(52) U.S. Cl.
CPC .................. *C01B 3/26* (2013.01); *B01J 19/24* (2013.01); *C01B 3/503* (2013.01);
(Continued)

(58) Field of Classification Search
CPC ... C01B 3/26; C01B 3/503; C01B 2203/0255; C01B 2203/0283; C01B 2203/041; C01B 2203/0811; C01B 2203/1058; C01B 2203/1235; C01B 2203/142; C01B 2203/1671; C01B 3/14; C01B 3/363; C01B 3/50; C01B 2203/1258; C01B 2203/1294;
(Continued)

(56) References Cited

U.S. PATENT DOCUMENTS 3,251,652 A     5/1966  Pfefferle
5,152,976 A    10/1992  Fong et al.
(Continued)

FOREIGN PATENT DOCUMENTS

EP        0326661 A1     8/1989
WO    WO-2009154512 A2 * 12/2009    ............... C01B 3/36

OTHER PUBLICATIONS

Moosbrugger et al. "Progress in Burner Design Using Additive Manufacturing With a Monolithic Approach and Added Features", Jun. 2019, Proceedings of ASME Turbo Expo 2019: Turbomachinery Technical Conference and exposition GT2019 P1-12 (Year: 2019).*
(Continued)

*Primary Examiner* — Anthony J Zimmer
*Assistant Examiner* — Syed T Iqbal
(74) *Attorney, Agent, or Firm* — Wyatt, Tarrant & Combs, LLP; Stephen C. Hall

(57) ABSTRACT

A method of producing hydrogen in a plant for hydrogen production during combustion of a mixture of hydrocarbon feedstock with an oxidizer with an oxidant excess ratio of less than 1. The method is characterized in that the combustion process is carried out at a temperature of less than 1400 K inside several cavities, completely or partially formed by a material permeable to a mixture of hydrocarbon feedstock with an oxidant.

12 Claims, 2 Drawing Sheets

(51) Int. Cl.
*B33Y 80/00* (2015.01)
*C01B 3/50* (2006.01)

(52) U.S. Cl.
CPC ............... *B01J 2219/1942* (2013.01); *B01J 2219/1943* (2013.01); *B33Y 80/00* (2014.12); *C01B 2203/0255* (2013.01); *C01B 2203/0283* (2013.01); *C01B 2203/041* (2013.01); *C01B 2203/0811* (2013.01); *C01B 2203/1058* (2013.01); *C01B 2203/1235* (2013.01); *C01B 2203/142* (2013.01); *C01B 2203/1671* (2013.01)

(58) Field of Classification Search
CPC ............... B01J 19/24; B01J 2219/1942; B01J 2219/1943; B01J 19/2475; B01J 19/2485; B33Y 80/00
See application file for complete search history.

(56) References Cited

U.S. PATENT DOCUMENTS

| | | |
|---|---|---|
| 6,103,411 A | 8/2000 | Matsubayashi et al. |
| 7,427,388 B2 | 9/2008 | Garg et al. |
| 9,017,433 B2 | 4/2015 | Katikaneni et al. |
| 9,487,400 B2 | 11/2016 | De Jong et al. |
| 2003/0044349 A1 | 3/2003 | Reichman et al. |
| 2011/0265379 A1 | 11/2011 | Bedetti et al. |
| 2014/0311884 A1 | 10/2014 | Disselhorst et al. |

OTHER PUBLICATIONS

Zeng "Syngas production from CO2/CH4 rich combustion in a porous media burner: Experimental characterization and elementary reaction model" Fuel 199 (2017) 413-419 (Year: 2017).*

* cited by examiner

PLANT FOR THE PRODUCTION OF HYDROGEN FROM ANY HYDROCARBON GASES

CROSS-REFERENCE TO RELATED APPLICATION

This application claims the benefit of U.S. Provisional Patent Application No. 63/129,027 filed on Dec. 22, 2020 which is incorporated in its entirety herein by reference herein.

FIELD OF THE DISCLOSURE

The present invention relates to a system and method for producing hydrogen by converting hydrocarbons into synthesis gas, and in particular to processes of oxidative conversion.

BACKGROUND

The invention relates to processes and devices for producing hydrogen by converting hydrocarbons into synthesis gas, and in particular to processes of oxidative conversion. The resulting synthesis gas can be used in the chemical industry for the production of methanol, dimethyl ether, synthetic liquid hydrocarbons and other products. The obtained hydrogen, after its separation from the gas mixture, can be used to power the fuel cells of vehicles and autonomous power supply sources, as well as a raw material and reductant in the chemical, petrochemical, metallurgical and other industries.

The main industrial methods for producing synthesis gas at present are steam, steam-oxygen and autothermal reforming of natural gas or coal. On an industrial scale, hydrogen is extracted by various methods from the resulting synthesis gas (mixtures of H2 and CO). Additional hydrogen is obtained by converting CO in the presence of steam to H2 and CO2. These methods require the use of expensive catalysts and are characterized by high complexity and cumbersome equipment, and high specific capital costs, which makes them unsuitable for creating small autonomous sources of synthesis gas and hydrogen.

SUMMARY OF THE INVENTION

A plant for the production of hydrogen from any hydrocarbon gases is provided with a main unit that is a converter. The closest design to the main unit of the proposed plant for producing synthesis gas with flameless combustion is a radiation burner for efficient combustion of hydrocarbons.

The burner contains a body, an injector in the form of a gas nozzle with a mixing tube and a perforated ceramic emitting nozzle made with the possibility of performing additional functions of a screen and a reflector. The burner is made in a volumetric configuration in the form of cavities with transverse dimensions and a depth of at least 10 mm, and perforated so that there can be either only the bottom of the cavities, or only the walls, or walls and the bottom of the cavities. Such structural elements of the burner ensure stable combustion even at the lowest gas pressures and increase its operational characteristics, increase the radiation efficiency and improve the radiation pattern.

As can be seen from the above mentioned characteristics, the specified burner, in comparison with the known devices for producing synthesis gas, is simple, compact and cheap. However, this device, i.e. the burner, provides the maximum output of infrared radiation from the internal cavities of the volumetric emitting perforated packing when burning fuel mixtures of lean or stoichiometric composition. The burner does not provide optimal conditions for the oxidative conversion of hydrocarbons into synthesis gas with a large excess of fuel, i.e., with a low excess ratio of the oxidizer: $\alpha<1$.

In accordance with the present invention, a method of producing hydrogen in a plant for hydrogen production during combustion of a mixture of hydrocarbon feedstock with an oxidizer with an oxidant excess ratio of less than 1. The method is characterized in that the combustion process is carried out at a temperature of less than 1400 K inside several cavities, completely or partially formed by a material permeable to a mixture of hydrocarbon feedstock with an oxidant.

In accordance with the present invention, a method for producing hydrogen (H2) from hydrocarbon material, comprises the following steps. the hydrocarbon material is mixed with an oxidant to form a mixture of the hydrocarbon material and the oxidant. The mixture is flowed through a porous material, wherein the porous material has, and is bounded by an inflow surface through which the mixture enters the porous material from an upstream space located behind the inflow surface, and an opposite outflow surface through which any combustion products of the mixture and any non-combusted portions of the mixture exit the porous material to enter a downstream space located in front of the outflow surface; and the mixture is combusted only in a combustion zone, wherein the combustion zone is only within the porous material and/or in front of and adjoining the outflow surface, to produce syngas that includes combustion products of the mixture and any non-combusted portions of the mixture. Heat generated by the combustion in the combustion zone raises the temperature of the combustion zone to a combustion temperature, which is a temperature sufficiently high to trigger the combustion of the mixture, and the temperature in the upstream space behind the inflow surface remains below the combustion temperature so that combustion does not occur behind the inflow surface to any significant extent.

Further according to the present invention, there is disclosed an apparatus for producing hydrogen (H2) from hydrocarbon material. The apparatus comprises an inner porous material that surrounds and bounds an inner cavity. The apparatus includes an intermediate cavity that surrounds and bounds the inner porous material. An outer porous material surrounds and bounds the intermediate cavity. An outer cavity that surrounds and bounds the outer porous material. An outer wall surrounds and bounds the outer cavity. An inner chamber wall that encases the inner cavity, is formed at least in part by the inner porous material, and has an outlet. An intermediate chamber wall that encases the intermediate cavity and is formed at least in part by the outer porous material. An outer chamber wall encases the outer cavity and has an outlet. A mixture-supply device is configured to supply a mixture of a hydrocarbon material and an oxidant to the intermediate cavity. The apparatus is configured to function such that a first portion of the mixture flows radially-inward from the intermediate cavity into the inner porous material to combust in a first combustion zone located in the inner porous material and/or in the inner cavity, to fill the inner cavity with first syngas comprising combustion products of the first mixture portion and any non-combusted portion of the first mixture portion. The first syngas exits the inner cavity through the inner chamber's outlet. A second portion of the mixture flows radiallyoutward from the intermediate cavity into the outer porous material, to combust within a second combustion zone located in the outer porous material and/or in the outer cavity, to fill the outer cavity with second syngas which comprises combustion products of the second mixture portion and any non-combusted portion of the second mixture portion. The second syngas exits the outer cavity through the outer-chamber's outlet. Heat generated by the combustion of the first and second mixture portions raises the temperature of the combustion zone to a combustion temperature, which is a temperature sufficiently high to trigger the combustion, while the temperature throughout the intermediate cavity remains below the combustion temperature so that combustion does not occur in the intermediate cavity.

One of the main objectives of the present invention is to simplify the main unit for producing synthesis gas so that it will provide a high productivity of the process with optimal volumetric ratios of H2 and CO in the resulting synthesis gas (H2/CO≈2.0).

Another objective of the present invention is to provide a plant that is simple, compact, cheap, has a higher energy efficiency and has a design that allows for the productivity of the plant to be easily adjusted within wide limits.

BRIEF DESCRIPTION OF THE DRAWING

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DESCRIPTION OF THE PREFERRED EMBODIMENTS

Figure 1:
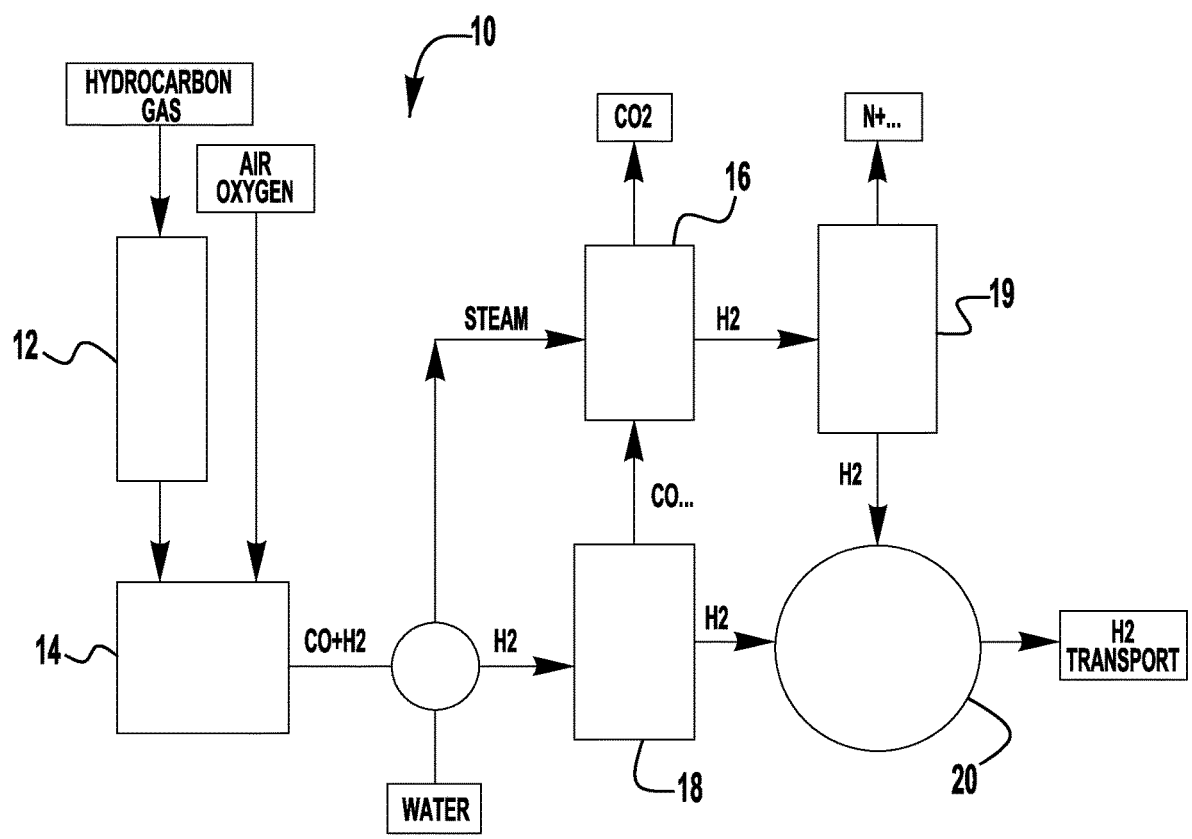
FIG. 1 is a diagram of a unit to produce hydrogen, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The invention relates to the field of chemical technology and can be used in the process of hydrogen production. The process of converting hydrogen from hydrocarbon gases incorporates the combination, partly of hydrogen obtained partly from synthesis gas and partly from a mixture of gases after steam reforming. Synthesis gas is obtained by combustion of a mixture of hydrocarbon feedstock with an oxidant. The oxidant has an excess ratio of less than 1 at a temperature of less than 1400K inside a porous metal structure of a certain shape formed by a material permeable to a mixture of hydrocarbon feedstock with an oxidant. The introduction of hydrocarbon gases with an oxidizer is carried out through the walls of the porous structure formed of a porous material. The withdrawal of flameless combustion products is carried out through the upper section of the cavity of a porous structure. Part of the synthesis gas, namely carbon monoxide CO, is converted into carbon dioxide CO2 and hydrogen H2 by the method of steam catalytic conversion.

The porous material can be formed from compressed wire mesh. The porous material includes filtration elements and filters for cleaning liquid and gaseous media from solid particles. The structure of compressed wire is purposely oriented wire spirals which form an open porosity system as a result of cold plastic deformation. The open porosity system provides all mechanical physical and hydro dynamic parameters required. The channel of the filtration element mode from compressed wire is a slot of variable cross section between adjacent wire loops due to the I like shape of the filtration element channels. It is virtually impossible for solid particles to become lodged in the channel. Lavender flow around the cylindrical section wire provides uniquely low hydraulic resistance of compressed wire mesh. Lower resistance enables the reduction of the active area of the filtration system by 1, 5 . . . 2 times filtration systems while builder efficiency remains the same. Higher resistance of the filtration elements from compressed wire mesh makes them a promising alternative to filters produced by powder metallurgy or screen technology, foam metal and screen filters. Due to their high strength, elasticity, corrosion and erosion resistance, filtration elements from compressed wire mesh can be refurbished and users can get up to 90% recovery of the initial filtration capacity. Filtration elements from compressed wire mesh can be easily adopt adapted to the requirements in terms of shape and efficient filtration service. They can also have the compressed mesh cut off for filters when the metal wire is of the required grade and selected from stainless steel, nickel, tungsten, aluminum, copper, brass, nichrome, molybdenum, etc. The wire material is chosen dependent on the technical requirements particular application and cost functionality ratio for example stainless steel or nichrome provides aggressive chemical media filtration, in particular filtration of polymeric solutions of temperatures of up to plus 800 degrees C. The filtration wire can be produced as multilayer anisotropic filtration elements of complex shapes where they are cut off as required.

The system 10, as shown in FIG. 1, consists of the following interconnected components: an installation 12 for sorption purification of hydrocarbon gases from sulfur-containing impurities; a matrix converter installation 14 for the conversion of hydrocarbon gases into synthesis gas; a modified catalytic steam reforming reactor 16 is for the conversion of CO to CO2 with the production of hydrogen; an installation 18 for hydrogen separation including a membrane separation unit, a preliminary purification unit 19 and a deep purification unit 20 to achieve up to 99.99% purity of hydrogen. The preliminary purification installation 19 for nitrogen separation is a standard diaphragm separator for nitrogen. The microcapillary hydrogen accumulator 20 is for the storage and transportation of hydrogen. The invention makes it possible to: simplify the technology for producing hydrogen; ensure high productivity of the process; and secure the process of storage and transportation of hydrogen.

The solution to the task is achieved with the proposed system 10 including an installation 14 for the conversion of hydrocarbon gases into synthesis gas and a method for producing synthesis gas during the flameless combustion of a mixture of hydrocarbon raw materials with an oxidizer. In the latter method, the oxidizer has an excess ratio of less than 1 when operated at a temperature of less than 1400K. The oxidizer is operated inside a porous metal structure of a certain shape formed by a material permeable to a mixture of hydrocarbon raw materials with an oxidizer. The introduction of hydrocarbon gases with the oxidizer is carried out through the walls of the porous structure, and the withdrawal of flameless combustion products is carried out through the upper section of the cavity of the porous surface permeable to hydrocarbon gases.

Hydrocarbon raw materials can be selected from a group of gaseous or liquid hydrocarbons that are part of organic raw materials and waste, oil, natural and associated gases. The process can be carried out using air, enriched air or oxygen as an oxidizer.

In order to control the composition of the resulting synthesis gas when introducing the mixture, it is possible to change the composition and/or the volume of the supplied mixture of hydrocarbon raw material with an oxidizing agent while passing it through the permeable walls of the porous structure. The process can be carried out at atmospheric pressure or above atmospheric pressure, preferably in the range from 0.1 to 3.0 MPa.

Figure 2:
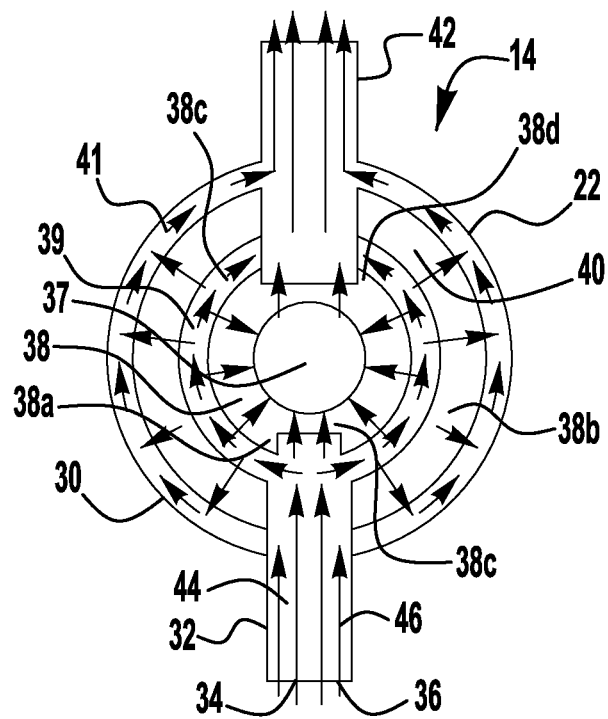
FIG. 2 is a diagram of a reactor-converter unit having spherical multi-cavity shapes, in accordance with the present invention.
Figure 3:
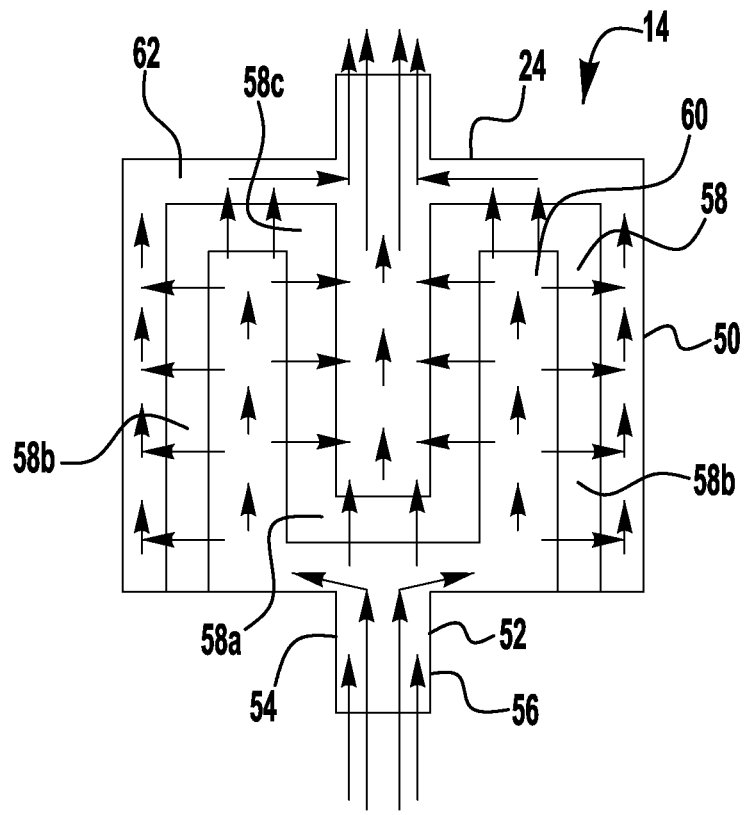
FIG. 3 is a diagram of a reactor-converter unit having cylindrical multi-cavity shapes, in accordance with the present invention.

The reactor-converter unit or installation 14 can have a spherical, multi-cavity shape 22, as shown in FIG. 2 and/or a cylindrical, multi-cavity shape 24 as shown in FIG. 3.

Referring to FIG. 2, the reactor-converter 14 consists of a body 30, an inlet 32 for supplying a mixture of hydrocarbon feedstock 34 with an oxidizer 36, a central bore 37, surrounded by an inner matrix 38. An inner passageway 39 surrounds the inner matrix 38. An outer matrix 40 surrounds an inner passageway 39 between the outer matrix 40 and the inner matrix 38. An outer passageway 41 surrounds the outer matrix 40. An outlet 42 exhausts hydrogen H2 and combustion products CO.

The hydrocarbon feedstock 34 flows into an inlet 44 of the inlet 32 and the oxidizer flows into an inlet 46 of the inlet 36. The hydrocarbon feedstock 34 and the oxidizer 36 then flow into and around the inner passageway 39. Some of the hydrocarbon feedstock 34 and the oxidizer 36 flows through the inner matrix 38 and into the central bore 37 during its passage to the outlet 42. The remainder of the hydrocarbon feedstock 34 and the oxidizer 36 flows from the inner passageway 39, through the outer matrix 40 and into and around the outer passageway 41 and through the outlet 42.

The bottom section 38c of the inner and several cavities 38, completely or partially formed by material permeable to a mixture of hydrocarbon feedstock with an oxidizer. The cavities 38 are made with a transverse dimension of at least 1 cm and a depth of at least 0.5 cm. The cavities 38 allow for the possibility of: introducing a mixture of hydrocarbon raw materials with an oxidizer through the permeable bottom 38a of the cavities; or through the permeable walls 38b of the cavities; or through the permeable walls 38a and the bottom 38b of the cavities; and for the removal of combustion products through the upper section 38d of the cavities 38.

The upper section 38d of the cavities 38 can be made either of the same material permeable to the mixture of hydrocarbon feedstock with an oxidizing agent as the walls and the bottom of the cavities, or it can be open. When the upper section 38d of the cavities is made open, the ratio of the depth of the cavities to their transverse dimension should be at least 3.

Referring to FIG. 3, the reactor-converter 24 consists of a body 50, an inlet 52 for supplying a mixture of hydrocarbon feedstock 54 with an oxidizer 56 and several cavities 58, completely or partially formed by material permeable to a mixture of hydrocarbon feedstock with an oxidizer. The cavities 58 are made with a transverse dimension of at least 1 cm and a depth of at least 0.5 cm. The cavities 58 allow for the possibility of: introducing a mixture of hydrocarbon raw materials with an oxidizer through the permeable bottom 58a of the cavities; or through the permeable walls 58b of the cavities; or through both the permeable walls 58b and the permeable bottom 58a of the cavities; and for the removal of combustion products through the upper section 58c of the cavities 58.

The upper section 58c of the cavities 58 can be made either of the same material permeable to the mixture of hydrocarbon feedstock with an oxidizing agent as the walls and the bottom of the cavities, or it can be open. When the upper section 58c of the cavities is made open, the ratio of the depth of the cavities to their transverse dimension should be at least 3.

The proposed method and device for its implementation were developed based on detailed experimental studies of the interconnection parameters such as the composition of the fuel-air mixture, the combustion mode and the input mixture, the temperature of the inner surface of the cavities, in which the combustion, the ratio of lateral size and depth of cavity etc., and their impact on the yield and composition of the resulting synthesis gas.

The principal result of the tests carried out is the establishment of the possibility of combustion of mixtures of a very rich composition—above the upper limit of ignition under normal conditions, for example, when the concentration of methane in the air is above 15% ($\alpha<0.45$).

Such combustion modes are practically unattainable in existing burner devices, but can be implemented in the proposed device, in which the combustion process takes place near the inner surface of the cavity (cavities), completely or partially formed by perforated ceramics or made of another heat-resistant material permeable to gas (for example, metal porous structure printed on a 3D printer). In surface combustion, the combustion front is located either above the surface, no further than 1 mm from it, or directly on the surface, or it can even go deep into the permeable walls of the cavity, to a depth of 3 mm.

To ensure a stable process of conversion of hydrocarbon feedstock into synthesis gas during combustion of the mixture, each cavity of the proposed device must have the following characteristic dimensions: the transverse dimension, determined by the critical diameter of flame penetration into the cavity, at least 1 cm, and the depth, determined by the characteristic width of the flame front above flat surface—at least 0.5 cm.

The localization of the flame front near the surface, leads to strong heating of the inner surface of the cavities, which provides a strong radiation flux whereby up to 50% of the combustion energy can be converted into radiation, which is "locked" inside the cavity. The most complete "blocking" of radiation occurs when the upper section of the cavity is closed by a material opaque for radiation but permeable to the outgoing gas, for example, the same material from which the walls and bottom of the cavity are made. But a sufficiently effective blocking of radiation can also be achieved in a cavity open from above if the ratio of its depth to the characteristic size of its cross-section is at least 3, which ensures the ratio of the sum of the lateral surface and bottom areas to the area of the outlet section is more than 6-10. In this case, the fraction of the energy carried away by the radiation leaving the cavity and not participating in the conversion process, proportional to the ratio of these areas, is small enough not to greatly affect the efficiency of the process, while for many practical applications such a design of the cavities is more technological.

Conversion of hydrocarbons with the help of this device gives a higher energy efficiency in comparison with known devices due to a sharp decrease in losses for the radiation of hot combustion products, since this radiation practically does not leave the cavity and goes to heating its surface and, therefore, fresh the reaction mixture. Due to this, it becomes possible to ensure the combustion of mixtures of a very rich composition, while the combustion temperature is lowered, and due to the lower combustion temperature, the heat transfer with the combustion products is reduced.

In the case of using heavier liquid hydrocarbons as hydrocarbon raw materials, the required vapor pressure can be achieved by preheating. The preheating can be through the use of either the heat of the heated cavity material, or through the heat of the hot gases leaving the device.

An important advantage of the proposed device is the ability to control its power (synthesis gas productivity) in a wide range either by simply changing the flow rate of the mixture through the permeable surfaces of the cavity, or by changing the size of the cavities, or by changing their number.

The advantage of the disclosed solution is the absence of the problem of contamination of the working surface of the cavity in the mode of possible soot formation, since soot formation proceeds at times that significantly exceed the time of conversion of hydrocarbon feedstock in the flame front and even the residence time of the reaction products in the cavity of the device.

In addition, the proposed invention allows for the control of the composition of the reaction products by changing the composition and/or volume of the supplied mixture along the height of the permeable walls of the cavity. If desired, additional gaseous components can be introduced into the feed gas stream to control the composition of the resulting products: for example, water vapor, carbon dioxide or process activating additives. Above the top of the device, i.e., above the effluent syngas stream, a catalytic reactor is placed to convert the carbon monoxide contained in the syngas into additional hydrogen.

As previously discussed, FIG. 2 shows a diagram of a device 30 for implementing the proposed method. The proposed device 30 contains a spherical body 30, divided into three volumes. In two of the volumes, cavities 38 are placed in which the combustion process is carried out. Syngas is discharged through the volumes. The spherical walls of the cavities are formed by a gas-permeable material. The upper sections of the cavities are open but can be closed with a gas-permeable material.

The device 24 shown in FIG. 3 works as follows. A mixture of hydrocarbon feedstock with an oxidizer is fed into the lower end of the matrix body, passes through permeable spherical walls 58$b$ and burns near the inner surface of cavities, heating the walls of the cavities. In the cavities, a powerful locked infrared radiation arises, providing stable combustion of a rich hydrocarbon mixture with the formation of incomplete oxidation products—synthesis gas, which enters the upper volume 3 through the upper sections of cavities 60 and 62.

The proposed block device for hydrogen production, which includes the following units: unit 12 for cleaning hydrocarbon gas from sulfur, if the concentration of sulfur in the gas mixture is more than 0.1%; unit 14 for conversion of hydrocarbon gases into synthesis gas; unit 16 for conversion of CO to CO2 to produce hydrogen; unit 19 for hydrogen separation; and unit 20, a metal hydride accumulator for hydrogen storage and transportation.

Unit 12 for removing sulfur from hydrocarbon feedstock is a typical industrial device that operates on the sorption principle. The desulfurization process is necessary to exclude equipment corrosion when the concentration of sulfur-containing substances in the hydrocarbon gas is more than 0.1%. The type of Plant is determined depending on the productivity of hydrocarbons and the concentration of sulfur-containing substances.

The operating principle of Unit 14 is presented above.

Unit 16 for steam conversion of carbon monoxide CO into carbon dioxide CO2 and hydrogen H2 operates on a catalytic principle. The CO gas after the separator, together with the steam generated from the water in the heat exchanger, is sent to the catalytic steam reforming reactor. The reactor consists of a metal tube filled with a nickel catalyst. When exposed to a nickel catalyst, hydrogen molecules H2 and molecules of carbon dioxide CO2 are formed. The heat exchanger uses the heat of the hot synthesis gas to heat the water resulting in the hydrogen production process being autothermal (without the supply of heat energy from the outside). As a result of this process, the yield of hydrogen increases by 15-20%.

Hydrogen separation units—18 (2 units) are used to separate hydrogen from associated gases. The principle of operation of this unit depends on the required purity of hydrogen. A membrane separator is used to produce 99% hydrogen, and a sorption separator is used for 99.99% hydrogen. The above equipment is mass-produced on an industrial scale.

Unit 20 is a magnesium metal hydride battery that is required for the accumulation and transportation of hydrogen. Depending on the temperature of the filler, the capture or release of hydrogen molecules occurs. Solid state batteries of this type can capture 7.5% hydrogen by weight, based on the weight of the filler. The battery is a metal box with a filler and an automated heating-cooling system. A hydrogen-charged battery is installed on a truck and transported to a hydrogen discharge point. This method of storage and transportation of hydrogen is absolutely safe, which cannot be said about the transportation of hydrogen in cargo tanks.

Thus, the claimed Plant provides a high productivity of the hydrocarbon-to-hydrogen conversion process, makes it possible to significantly simplify the technology, reduces the cost of equipment and operating costs, and eliminates the problems caused by soot formation. To obtain hydrogen by the proposed method, you can use any hydrocarbon gases and even liquid hydrocarbons. The Plant for the production of hydrogen of the present invention, in contrast to other known reactors, is simple and compact, has a higher energy efficiency and has a design that allows you to easily adjust the productivity (power) of the Plant over a wide range. The disclosed Plant is promising for the processing of hydrocarbon raw materials of small objects, for example, dispersed power supply sources based on electrochemical generators (fuel cells) and hydrogen filling stations. At present, it is precisely the absence of compact autonomous sources of hydrogen that is one of the main factors hindering the development of hydrogen energy.

While the above descriptions contain many specificities, these should not be construed as limitations on the scope, but rather as an exemplification of several embodiments thereof. The invention is capable of considerable modification, alteration, and equivalents. Accordingly, the scope should be determined not by the embodiments illustrated, but by the appended claims and their legal equivalents.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for producing hydrogen ($H_2$) from hydrocarbon material, comprising:
    mixing the hydrocarbon material with an oxidant to form a mixture of the hydrocarbon material and the oxidant;
    flowing of the mixture through a porous material, wherein the porous material comprises an inflow surface through which the mixture enters the porous material and an outflow surface through which combustion products and non-combusted portions of the mixture exit the porous material to a downstream space located in front of the outflow surface; and
    initiating a first combustion of the mixture in a combustion zone, wherein the combustion zone is located within the porous material or in front of and adjacent to the outflow surface or both, thereby producing syngas that comprises combustion products of the mixture;
    wherein heat generated by the first combustion raises a first temperature of the combustion zone to a combustion temperature sufficiently high to trigger a second combustion of the mixture,
    wherein a second temperature in an upstream space behind the inflow surface relative to a direction of flow of the mixture remains below the combustion temperature, and
    wherein the combustion zone does not extend outside of the porous material more than 1 mm beyond the outflow surface, and does not extend within the porous material more than a depth of 3 mm from the outflow surface, and the combustion occurs only downstream of the porous material relative to a direction of flow of the mixture.

2. The method of claim 1, wherein the combustion occurs both within the porous material and downstream of the outflow surface relative to a direction of flow of the mixture.

3. The method of claim 1, wherein the combustion occurs only within the porous material.

4. The method of claim 1, further comprising producing the porous material by making a metal porous structure through printing on a 3D printer.

5. The method of claim 1, wherein the porous material is a perforated ceramic.

6. The method of claim 1, wherein the porous material is porous metal.

7. The method of claim 1, wherein the oxidant is present at an excess air ratio of less than 1.

8. The method of claim 1, wherein the method is first performed with a hydrocarbon material that is gaseous at room temperature and then performed with a hydrocarbon material that is liquid at room temperature.

9. The method of claim 1, wherein the porous material's outflow surface surrounds and bounds an inner cavity; the porous material's inflow surface surrounds the outflow surface; the mixture flows radially inward through the inflow surface into the porous material; and combustion products of the mixture and/or any non-combusted portions of the mixture exit the porous material through the outflow surface into the inner cavity.

10. The method of claim 1, wherein the porous material is in the form of a spherical shell or a cylinder.

11. The method of claim 1, further comprising:
    catalytically converting steam and carbon monoxide, which is produced by the combustion, into carbon dioxide and hydrogen by catalytic conversion and adding steam to the syngas; and
    generating the steam by a heat exchanger transferring heat from the syngas to water, to convert the water to the steam.

12. The method of claim 1, further comprising controlling the composition of the combustion products by changing the composition and volume of the mixture.

* * * * *